United States Patent
Hindi et al.

(10) Patent No.: US 11,209,051 B2
(45) Date of Patent: Dec. 28, 2021

(54) CLUTCH ASSEMBLY PRESSURE PLATE WITH TAPERED FACE

(71) Applicant: FORD GLOBAL TECHNOLOGIES, LLC, Dearborn, MI (US)

(72) Inventors: Yasser Hindi, Dearborn, MI (US); Carl Garbacik, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/828,262

(22) Filed: Mar. 24, 2020

(65) Prior Publication Data
US 2021/0301883 A1    Sep. 30, 2021

(51) Int. Cl.
| | |
|---|---|
| *F16D 13/52* | (2006.01) |
| *F16D 13/70* | (2006.01) |
| *F16D 13/64* | (2006.01) |
| *F16D 13/68* | (2006.01) |
| *F16D 121/04* | (2012.01) |

(52) U.S. Cl.
CPC ........... *F16D 13/52* (2013.01); *F16D 13/648* (2013.01); *F16D 13/68* (2013.01); *F16D 13/70* (2013.01); *F16D 2121/04* (2013.01)

(58) Field of Classification Search
CPC ...... F16D 13/22–2013/565; F16D 25/062–065
See application file for complete search history.

(56) References Cited

U.S. PATENT DOCUMENTS

| | | | | |
|---|---|---|---|---|
| 5,073,143 | A | * | 12/1991 | Friedman .............. F16F 15/139 464/68.41 |
| 5,720,373 | A | * | 2/1998 | Schulz-Andres ....... F16D 13/64 192/107 R |
| 6,702,081 | B2 | * | 3/2004 | Gorman .............. F16D 25/0638 192/109 R |
| 9,109,641 | B2 | | 8/2015 | Kremer et al. |
| 10,337,562 | B2 | | 7/2019 | Heitzenrater et al. |
| 2004/0104093 | A1 | | 6/2004 | Friedrich et al. |
| 2011/0073432 | A1 | * | 3/2011 | Gokan .................... F16D 13/56 192/70.12 |
| 2015/0275982 | A1 | * | 10/2015 | Tokito .................... F16D 13/56 192/70.23 |
| 2018/0372166 | A1 | * | 12/2018 | Carey .................... F16D 25/00 |

FOREIGN PATENT DOCUMENTS

| | | | |
|---|---|---|---|
| JP | H09257058 A | 9/1997 | |
| WO | WO-2005073584 A1 * | 8/2005 | ............. F16D 13/26 |

* cited by examiner

Primary Examiner — Ernesto A Suarez
Assistant Examiner — Lillian T Nguyen
(74) Attorney, Agent, or Firm — Vincent Mastrogiacomo; Brooks Kushman P.C.

(57) ABSTRACT

A pack includes a set of first friction disks interleaved with a set of second friction disks to form a stack. An annular pressure plate has an engagement side disposed against the stack. The engagement side includes an outer circumferential edge, an inner circumferential edge, a flat face extending radially inward from the outer edge, a step axially recessed into the engagement side relative to the face, and a tapered face extending from the step to the inner circumferential edge. The tapered face is disposed against an end one of the first friction disks, and the flat face is radially outboard of the first friction disks.

20 Claims, 3 Drawing Sheets

CLUTCH ASSEMBLY PRESSURE PLATE WITH TAPERED FACE

TECHNICAL FIELD

This disclosure relates to clutches for motor vehicles and more particularly to pressure plate design.

BACKGROUND

Many vehicles are used over a wide range of vehicle speeds, including both forward and reverse movement. Most engines operate efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most automatic transmissions include planetary gear sets that modify the speed ratio between the input and output shafts. A simple planetary gear set has a sun gear, a ring gear, planet gears meshing between the sun gear and the ring gear, and a planet carrier connected to each of the planet gears. Clutches are used to couple select components of the planetary gear sets with other components to create the various gear ratios of the transmission.

Multi-disk wet clutches are commonly used to hold the components of the planetary gear sets. The clutches include clutch packs having a set of separator plates interleaved with a set of friction plates. A friction material is applied to the faces of the friction plates. The friction plates are typically connected to a rotatable component, and the separator plates are typically connected to either a rotatable or a stationary component. In many cases, a hydraulic piston is used to frictionally engage the plates to lock the components to each other when the clutch is ON.

SUMMARY

According to one embodiment, a clutch pack includes a set of first friction disks interleaved with a set of second friction disks to form a stack. An annular pressure plate has an engagement side disposed against the stack. The engagement side includes an outer circumferential edge, an inner circumferential edge, a flat face extending radially inward from the outer edge, a step axially recessed into the engagement side relative to the face, and a tapered face extending from the step to the inner circumferential edge. The tapered face is disposed against an end one of the first friction disks, and the flat face is radially outboard of the first friction disks.

According to another embodiment, a multi-plate wet clutch assembly includes a clutch housing, a clutch hub, and a clutch pack configured to couple the housing to the hub. The clutch pack has separator plates rotationally fixed to the housing and friction plates rotationally fixed to the hub. The separator plates and the friction plates are interleaved with each other. An annular pressure plate has an engagement side disposed against the clutch pack. The engagement side includes an outer circumferential edge, an inner circumferential edge, a flat face extending radially inward from the outer edge, a step axially recessed into the engagement side relative to the face, and a tapered face extending from the step to the inner circumferential edge. The tapered face is disposed against an end one of the friction plates, and the flat face is radially outboard of the friction plates.

According to yet another embodiment, a clutch assembly includes a clutch pack having separator plates, friction plates interleaved with the separator plates, and interior separator springs each disposed between an adjacent pair of the separator plates. An annular pressure plate has an engagement side disposed against the clutch pack. The engagement side includes an outer circumferential edge, an inner circumferential edge, a flat face extending radially inward from the outer edge, a step axially recessed into the engagement side relative to the face, and a tapered face extending from the step to the inner circumferential edge. The tapered face is disposed against an end one of the separator plates, and the flat face is radially outboard of the friction plates. An exterior separator spring is disposed between the flat face and against the end one of the separator plates.

DETAILED DESCRIPTION

Figure 1:
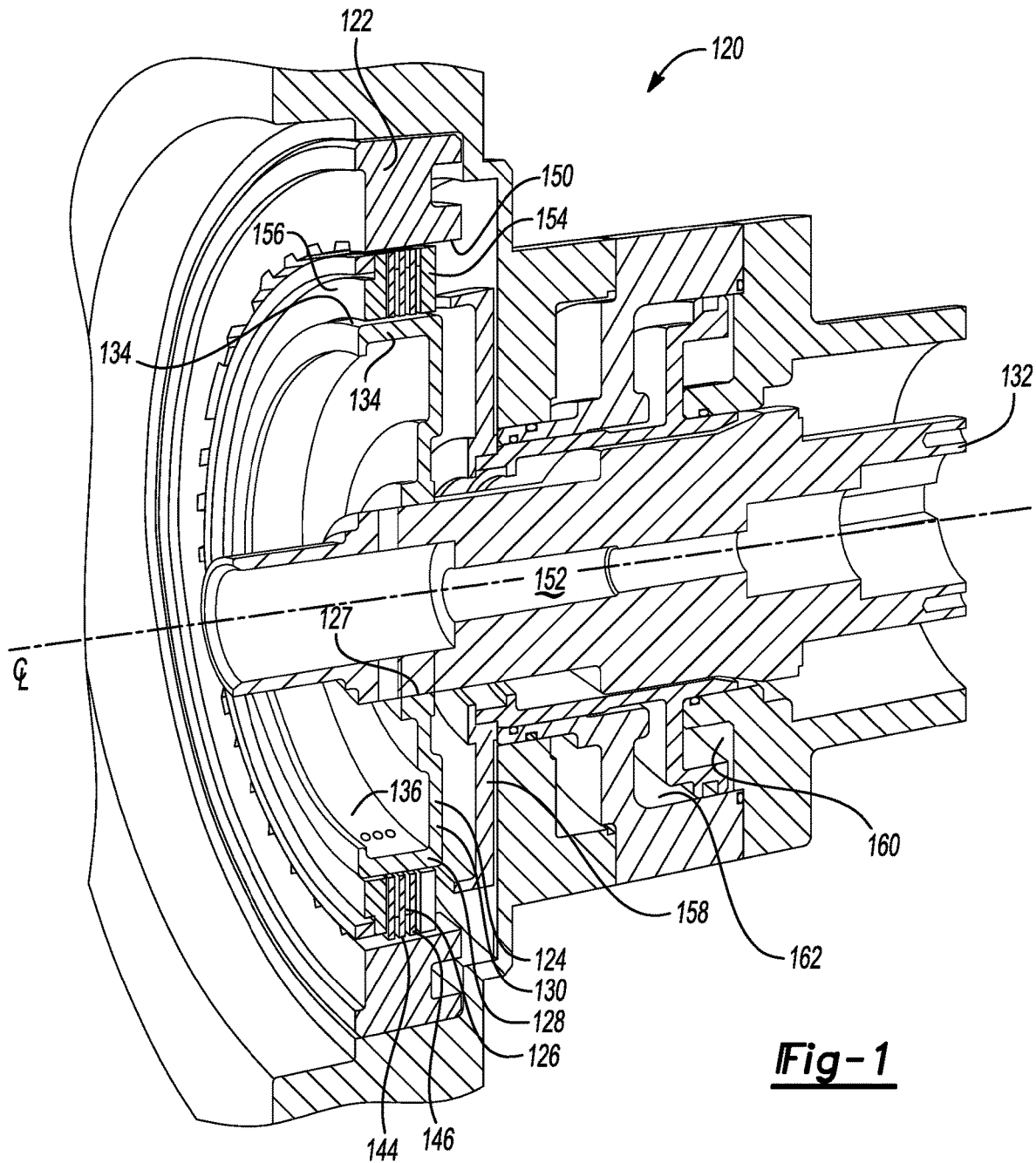
FIG. 1 is a perspective view, in cross section, of a clutch assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

Figure 2:
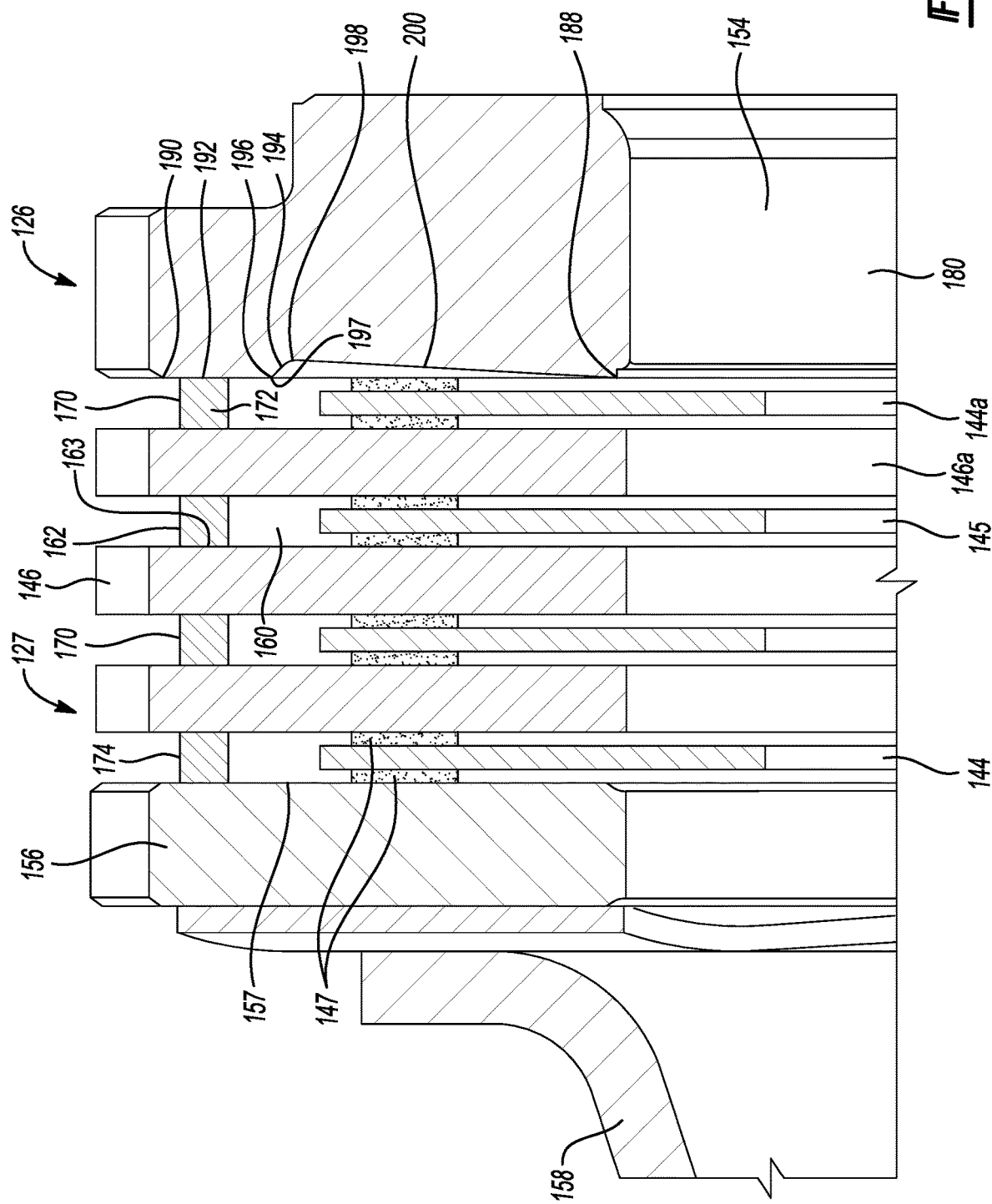
FIG. 2 is a magnified fragmentary cross-sectional view of a clutch pack of the clutch assembly.

The following figures and related text describe example clutches (sometimes referred to as brakes) that may be used in a transmission or any other suitable application. Referring to FIGS. 1 and 2, a multi-plate wet clutch assembly 120 generally includes a clutch housing 122, a clutch hub 124, and a clutch pack 126 radially disposed between the housing 122 and the hub 124. The clutch hub 124 defines a central bore 127 connected to a first rotatable component 132 such as a shaft. The central bore 127 may define splines that engage with teeth on the outer surface of the rotatable component 132. The clutch hub 124 also includes an annulus 128 adjacent to the clutch pack 126 and a wall portion 130 that generally extends radially between the annulus 128 and the central bore 127. The annulus 128 defines an outer surface 134 and an inner surface 136. The clutch housing 122 may be connected to a second rotatable component such as a component of a planetary gear set or a shaft or it may be connected to a stationary object such as a housing, e.g., a transmission case.

The clutch pack 126 includes a plurality of friction plates 144 interleaved with a plurality of separator plates 146 arranged in a stack 127. Both types of these plates may be generically referred to as friction disks. The clutch pack 126 may be a wet clutch that is cooled by oil, e.g., transmission fluid. The friction plates have smaller inner and outer diameters than the separator plates 146 so that the friction plates 144 can connect to the hub 124 and the separator plates 146 can connect to the housing 122. Each of the friction plates 144 may include a core 145 and a friction material 147 applied to one or more outer surfaces of the core 145 such as both sides as shown. The friction material 147 could also be, or only be, on the separator plates. A pressure plate 154 and a reaction plate 156 may be disposed on the outer ends of the stack 127 and sandwich the friction plates 144 and the separator plates 146.

The outer surface 134 of the annulus is connected with each of the friction plates 144 of the clutch pack 126 via a spline or other suitable connection. The inner surface 150 of the clutch housing 122 is connected with each of the separator plates 146 of the clutch pack 126 via a spline or other suitable connection. The clutch pack 126 selectively locks the housing 122 to the hub 124 when the clutch pack 126 is fully engaged and allows relative rotation between the housing 122 and the hub 124 when the clutch pack is 126 disengaged or slipping.

Interior separator springs 170 may be interleaved with the separator plates 146, i.e., a spring 170 is disposed between each adjacent pair of the separator plates 146. The separator springs may be coaxial and located at a same radial position relative to a centerline of the clutch assembly 120. The clutch pack 126 may also include a pair of exterior separator springs 172 and 174. The exterior separator spring 172 is disposed between the pressure plate 154 and an end one of the separator plates 146a. The exterior separator spring 174 is disposed between the reaction plate 156 and another end one of the separator plates. The separator springs 172 and 174 may also be coaxial with the interior separator springs 170. The separator springs 170, 172, and 174 are radially outboard of the friction plates 144. The separator springs 170, 172, and 174 may be the same type of spring. The separator springs bias the friction plates 144 away from the separator plates 146 to reduce clutch drag. Clutch drag is particularly problematic when the friction plates and separator plates have high relative speeds. By including the separator springs, the clutch assembly 120 is suitable for use in applications where the component connected to the clutch hub 124 rotates a lot faster than the component connected to the clutch housing 122, or vice versa, when the clutch is disengaged.

The separator springs may be waved springs. The separator springs may be annular having an inner diameter 160, an outer diameter 162, and faces 163 extending between the diameters. The annular springs may be centered on an axial centerline of the clutch 120. For the interior springs 170, the faces 163 are disposed against the separator plates 146. In the case of the spring 172, one of the faces 163 is disposed against the pressure plate 154 and the other the faces is disposed against the separator plate 146a. For spring 174, one of the faces 163 is disposed against the reaction plate 156 and the other the faces 163 is disposed against the end separator plate.

The clutch pack 126 may be actuated by a hydraulic piston 158. The piston 158 frictionally engages the friction plates 144 with the separator plates 146 when oil is supplied to the supply chamber 160. A balance chamber 162 may be provided to bias the piston 158 away from the clutch pack 126 when the clutch 120 is disengaged. A spring or other biasing member (not shown) may be disposed within the balance chamber 162 to bias the piston away from the clutch pack 126. The clutch pack 126 may be a wet clutch that is cooled by oil, e.g., transmission fluid.

The clutch assembly 120 is designed to have very high unit loading, such as greater than 10 megapascal (MPa). This high loading tends to buckle the clutch pack 126 causing the radially outer portions of the plates to move towards each other and the inner portions to move away from each other. This creates uneven loading on the plates which may result in premature wear and reduced part life. To prevent this buckling, the pressure plate 154 includes a taper. The taper promotes even loading on the faces of the friction disks. The reaction plate 156 may include a flat engagement face 157.

Figure 3:
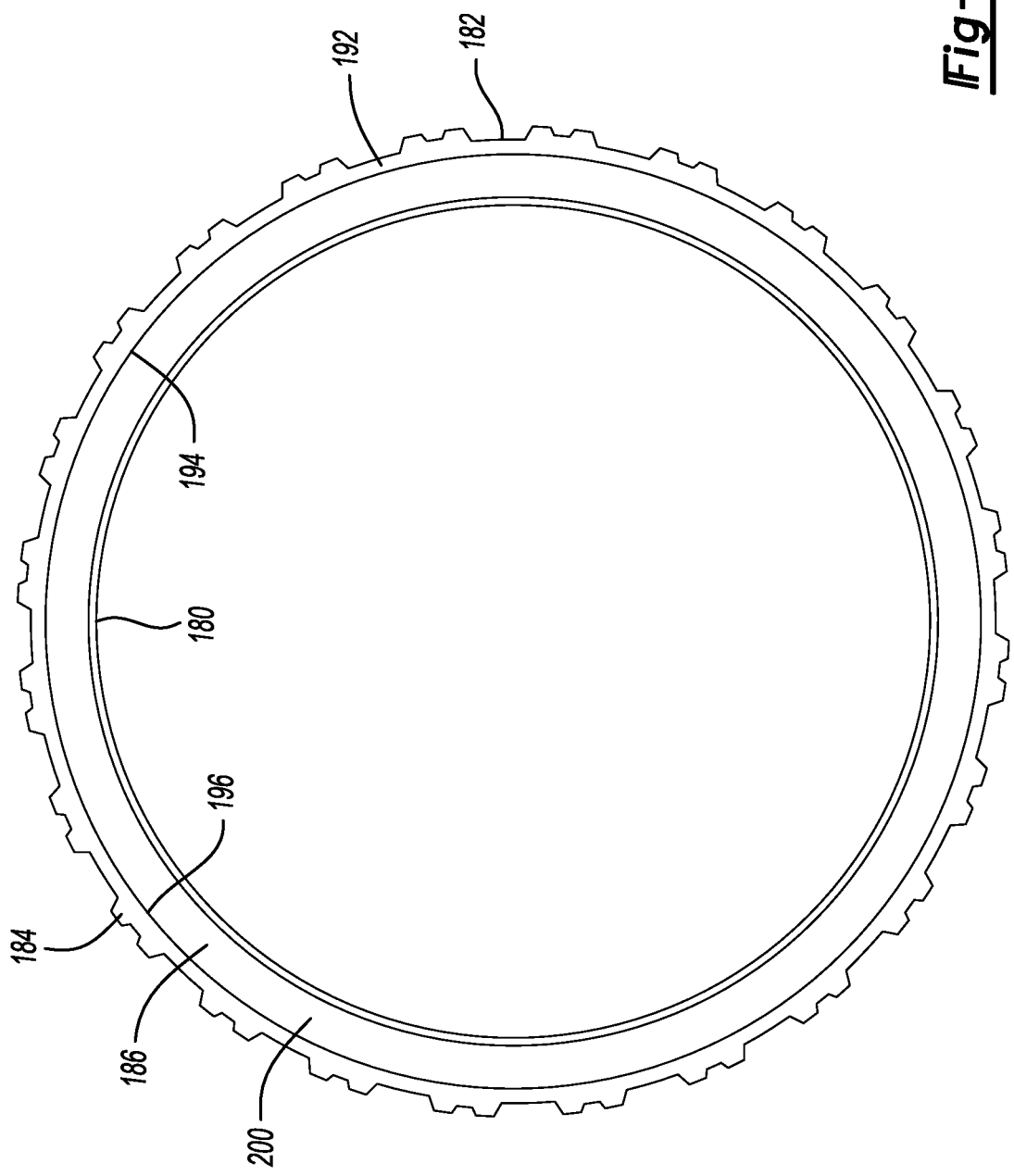
FIG. 3 is a front view of a pressure plate of the clutch pack.

Referring to FIGS. 2 and 3, the pressure plate 154 is annular and includes an inner diameter 180 and an outer diameter 182. Splines or other projections 184 extend radially from the outer diameter 182. The splines 184 may be received within the clutch housing 122. Alternatively, the splines may be provided on the inner diameter 180 to connect the pressure plate 154 to the hub 124. The pressure plate 154 includes an engagement side 186 that is disposed against the end of the clutch pack 126. More specifically, the pressure plate 154 is disposed against the end one of the friction disks 144a. The pressure plate 154 may be formed of powdered metal or other suitable material.

The engagement side 186 includes an inner circumferential edge 188 and an outer circumferential edge 190. The edges 188, 190 may be coplanar, i.e., they are located at a same axial position relative to the centerline of the clutch. A flat face 192, i.e., oriented radially, is provided on the inner side 186. The flat face 192 is annular and extends radially from the outer edge 190 partially towards the inner edge 188. A step 194 is axially recessed into the engagement side 186 relative to the face 192. The step 194 defines an inner circumference 196 of the flat face 192. The step 194 may include a first end 197 joined to the flat face 192 and a second end 198 that is the most recessed portion of the engagement side 186. The step 194 may be recessed from the flat face 192 by at least 0.5 millimeters. (The step is shown enlarged for illustrative purposes.) The step 196 may extend axially or at one or more oblique angles. The step 194 may also be a fillet.

A tapered face 200 radially extends from the second end 198 of the step 194 to the inner circumferential edge 188. The tapered face 200 is arranged so that, from the inner edge 188, the face 200 slants away from the friction disk 144a. The tapered face 200 is also generally annular and includes an outer diameter at the second end of the step 198 and an inner diameter that may coincide with the inner edge 188. The tapered face 200 may be linear between the inner and outer diameters. The amount of taper of the face 200 can be adjusted by increasing or decreasing the depth of the step 194. Increasing the depth of the step 194 further reduces the pressure on the outer portions of the friction plates 144, whereas decreasing the depth of the step 194 increases the pressure on the outer portions of friction plates 144. The depth of the step 194 can be tuned to match the axial loading of the clutch pack to provide an even distribution of loading across the faces of the friction plates 144.

The flat face 192 is radially outboard of the friction plates 144 and provides a seat for the spring 172. The spring 172 may include a first side disposed against the separator plate 146 and a second side disposed against the flat face 192. The step 194 is also located radially outboard of the friction plates 144. The tapered face 200 is the portion of the pressure plate 154 that engages with the friction plate 144a. When the clutch pack 126 is lightly or disengaged, only the inner portion of the tapered face 200 is in contact with the friction plate 144a. As the clutch pack 126 becomes engaged, the friction plates 144 tilt causing more of the friction plate 144a to engage with the tapered face 200. The tapered face 200 provides clearance for this tilt providing even load distribution.

The tapered face 200 is radially taller than the flat face 192. That is, a first radial distance between the inner circumferential edge 188 and the step 194 is greater than a second radial distance between the outer circumferential edge 190 and the step 194. In one or more embodiments, the first radial distance is at least 3 times greater than the first radial distance.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch pack comprising:
 a set of first friction disks interleaved with a set of second friction disks to form a stack; and
 an annular pressure plate including an engagement side disposed against the stack, the engagement side including:
  an outer circumferential edge,
  an inner circumferential edge,
  a flat face extending radially inward from the outer edge,
  a step axially recessed into the engagement side relative to the face, and
  a tapered face extending from the step to the inner circumferential edge, wherein the tapered face is disposed against an end one of the first friction disks, and the flat face is radially outboard of the first friction disks.

2. The clutch pack of claim 1 further comprising a first separator spring having a first portion disposed against the flat face and a second portion disposed against one of the second friction disks.

3. The clutch pack of claim 2 further comprising a second separator spring having a first portion disposed against the one of the second friction disks and a second portion disposed against another of the second friction disks.

4. The clutch pack of claim 3, wherein the first and second separator springs are coaxial.

5. The clutch pack of claim 1, wherein the inner and outer edges are coplanar.

6. The clutch pack of claim 1, wherein each the first friction disks includes a core having opposing radial faces and a friction material applied to at least one faces.

7. The clutch pack of claim 6, wherein, for each of the first friction disks, the friction material is applied to both of the faces.

8. The clutch pack of claim 1, wherein a first radial distance between the inner circumferential edge and the step is greater than a second radial distance between the outer circumferential edge and the step.

9. The clutch pack of claim 8, wherein first radial distance is at least 3 times greater than the first radial distance.

10. The clutch pack of claim 1 further comprising a reaction plate disposed against the stack opposite the pressure plate, wherein the reaction plate is configured to couple with an actuator operable to engage the clutch pack.

11. The clutch pack of claim 1, wherein the pressure plate is formed of powdered metal.

12. A multi-plate wet clutch assembly comprising:
 a clutch housing;
 a clutch hub;
 a clutch pack configured to couple the housing to the hub, the clutch pack including separator plates rotationally fixed to the housing and friction plates rotationally fixed to the hub, wherein the separator plates and the friction plates are interleaved with each other; and
 an annular pressure plate including an engagement side disposed against the clutch pack, the engagement side including:
  an outer circumferential edge,
  an inner circumferential edge,
  a flat face extending radially inward from the outer edge,
  a step axially recessed into the engagement side relative to the face, and
  a tapered face extending from the step to the inner circumferential edge, wherein the tapered face is disposed against an end one of the friction plates, and the flat face is radially outboard of the friction plates.

13. The clutch assembly of claim 12 further comprising a first separator spring having a first portion disposed against the flat face and a second portion disposed against one of the separator plates.

14. The clutch assembly of claim 13 further comprising a second separator spring having a first portion disposed against the one of the separator plates and a second portion disposed against another of the separator plates.

15. The clutch assembly of claim 14, wherein the first and second separator springs are coaxial.

16. The clutch assembly of claim 12, wherein the inner and outer edges are coplanar.

17. The clutch assembly of claim 12, wherein a first radial distance between the inner circumferential edge and the step is greater than a second radial distance between the outer circumferential edge and the step.

18. The clutch pack of claim 1 further comprising:
 a reaction plate disposed against the clutch pack opposite the pressure plate; and
 a hydraulic piston operably coupled to the reactor plate and configured to urge to reactor plate towards the pressure plate to engage the clutch pack and selectively couple the housing and the hub.

19. A clutch assembly comprising:
 a clutch pack including separator plates, friction plates interleaved with the separator plates, and interior separator springs each disposed between an adjacent pair of the separator plates;

an annular pressure plate including an engagement side disposed against the clutch pack, the engagement side including:
an outer circumferential edge,
an inner circumferential edge,
a flat face extending radially inward from the outer edge,
a step axially recessed into the engagement side relative to the face, and
a tapered face extending from the step to the inner circumferential edge, wherein the tapered face is disposed against an end one of the separator plates, and the flat face is radially outboard of the friction plates; and
an exterior separator spring disposed between the flat face and against the end one of the separator plates.

20. The clutch assembly of claim 19, wherein the interior separator springs and the exterior separator spring are wave springs and are supported on a centerline of the clutch assembly.

* * * * *